Oct. 25, 1966

H. L. WEST 3,281,771

PRESSURE COMPENSATED TRANSDUCER UTILIZING
NON GAS ENTRAPPED DECOUPLERS

Filed Dec. 29, 1964

INVENTOR.
HERBERT L. WEST, DECEASED
BY ALMA L. WEST, EXECUTRIX

BY Henry Hauler
J. A. Cooke
ATTORNEYS

INVENTOR.
HERBERT L. WEST, DECEASED
BY ALMA L. WEST, EXECUTRIX
ATTORNEYS

United States Patent Office 3,281,771
Patented Oct. 25, 1966

3,281,771
PRESSURE COMPENSATED TRANSDUCER UTILIZING NON GAS ENTRAPPED DECOUPLERS
Herbert L. West, deceased, late of Doylestown, Pa., by Alma L. West, executrix, Doylestown, Pa., assignor to the United States of America as represented by the Secretary of the Navy
Filed Dec. 29, 1964, Ser. No. 422,091
17 Claims. (Cl. 340—8)

The invention described herein may be manufactured and used by or for the Government of the United States of America for governmental purposes without the payment of any royalties thereon or therefor.

The present invention relates to sonar transducers and more particularly relates to deep dip transducers operable at depths greater than that at which present day transducers operate.

Transducers of the type to be discussed and described herein generally comprise a projector portion for transmitting sonar signals and a hydrophone portion for receiving sonar signals. It is known in the art to construct projectors of a series of barium titanate cylinders each made up of staves of piezoelectric ceramic which are silvered and polarized on their radial surfaces and cemented together. Two or more such cylindrical structures are co-linearly supported between end members to afford an assembly which radiates sound in directions transverse to the cylinder axis, this assembly being denoted as a line projector. The line projectors of the prior art illustrate a plurality of these radially resonant shell vibrator structures mounted on a common support tube having end caps with the vibrators separated from each other and from the end caps by washers of nylon or other resilient material. Pressure release rings, made for example of Corprene, space and the vibrator structures from the tube and elongated bolts extending in the axial direction cooperate with the end plates to maintain the apparatus in an assembled rigid condition. The pressure release material is used between adjacent cylinders and between the cylinders and the supporting tube to isolate these elements of the transducer, that is, to minimize the direct mechanical coupling between adjacent active elements as well as between such active elements and other parts of the structure which are essential to the physical integrity and form of the transducer.

As indicated above, the decoupling between adjacent piezoelectric elements in a line transducer (or a stave of such transducer) has, ordinarily, been accomplished by use of pressure release materials. Such materials include Corprene, Cell-tite rubber, and air spaces, the first two being effective because of the entrapped air. The problem arising from the use of these materials is that the air cells incorporated in the structure decrease in size as a function of increased pressure with the net result that these materials decreased in effectiveness as depth increased, becoming more or less useless at moderate pressures, for example, those incident to depths of 500 feet.

This decrease in the effectiveness with increasing depth in turn created problems in the areas of calibration and determination of response pattern characteristics of the transducer. It is desired to calibrate and determine the operational characteristics of a transducer at the depths available at existing facilities with the knowledge that the data so obtained would apply to operations at much greater depths, thereby precluding the necessity of calibrating and determining the response pattern characteristics at these greater depths.

In the application of transducers to the detection and localization of underwater targets, such as submarines, by echo ranging techniques, a hydrophone construction is required which provides for omnidirectional search, concomitantly with the determination of the target range and bearing with high accuracy. An omnidirectional search comprises the detection of sound sources or sound reflecting objects from any direction normally disposed of a known axis. Detection and localization have been accomplished heretofore by hydrophones embodying a reflector structure, said structure forming a plurality of circumferentially arranged sectors, each subtending a sector of search. Similar to the construction of the projectors discussed above, the reflectors utilized in hydrophone equipment have their walls constructed of materials such as Corprene, Cell-tite rubber, or the like. See U.S. Patent No. 2,961,636 to Benecke for "Electroacoustic Transducer for Omnidirectional Search" issued November 22, 1960. These materials have been proven effective because of the entrapped air which serves as the reflecting medium. However, here as above these materials lost their efficacy at even moderate hydrostatic pressures since the air cells incorporated in the structure decreased in size as a function of increased pressure with the net result that these materials decreased in effectiveness as depth increased. Again, extreme problems were encountered in an attempt to maintain the operational characteristics of the transducer constant with increased depth.

The general purpose of this invention is to provide a transducer which embraces all of the advantages of similarly employed prior art devices and possesses none of the aforesaid described disadvantages. To attain this, the present invention contemplates a transducer structure embodying unique structural arrangements and materials thereby permitting use of the transducer at depths which heretofore presented severe operational difficulties.

An object of the present invention is the provisions of a transducer operable at great depths and relatively unaffected by the hydrostatic pressures incident thereto.

Another object of the present invention is to provide a transducer which can be measured and calibrated at convenient depths and which characteristics will remain constant at greater depths at which actual measurements are difficult to obtain.

A further object of the invention is to provide a transducer which has a high density thus being particularly adaptable for use where a high value of sinking rate is desired or required.

Still another object is to provide a reflector which decouples, reflects, absorbs, or otherwise alters the transmission of sound through water in such a manner that a directional characteristic, or directional characteristics are imparted to the transducer.

Yet another object of the present invention is the provision of a reflector in which the directional characteristics so imparted to such transducer are unaffected within certain limitations by hydrostatic pressures incident to greath depths.

A still further object of the present invention is to provide a hydrophone reflector which is constructed in such a manner that the response pattern obtained thereby remains constant for increases in hydrostatic pressure since the total mass involved would remain constant with pressure and the dimensions of the reflector would remain essentially constant.

Various other objects and advantages will appear from the following description of an embodiment of the invention, and the novel features will be particularly pointed out hereinafter in connection with the appended claims.

In the drawings:
FIG. 1 shows an elevation view of an embodiment of the invention;

Figure 1:
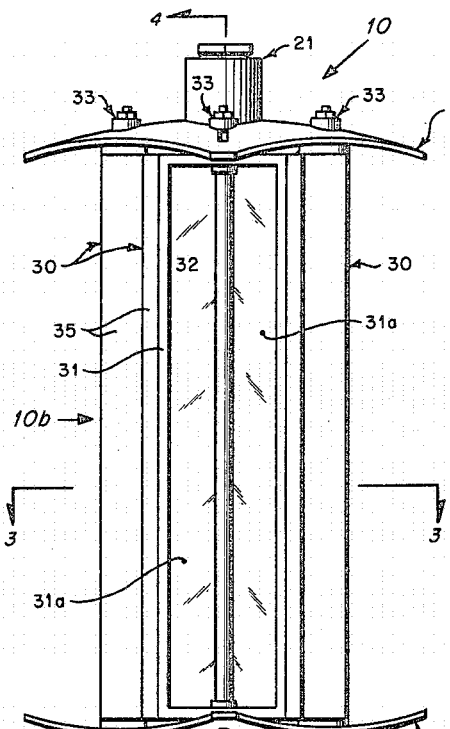
Figure 4:
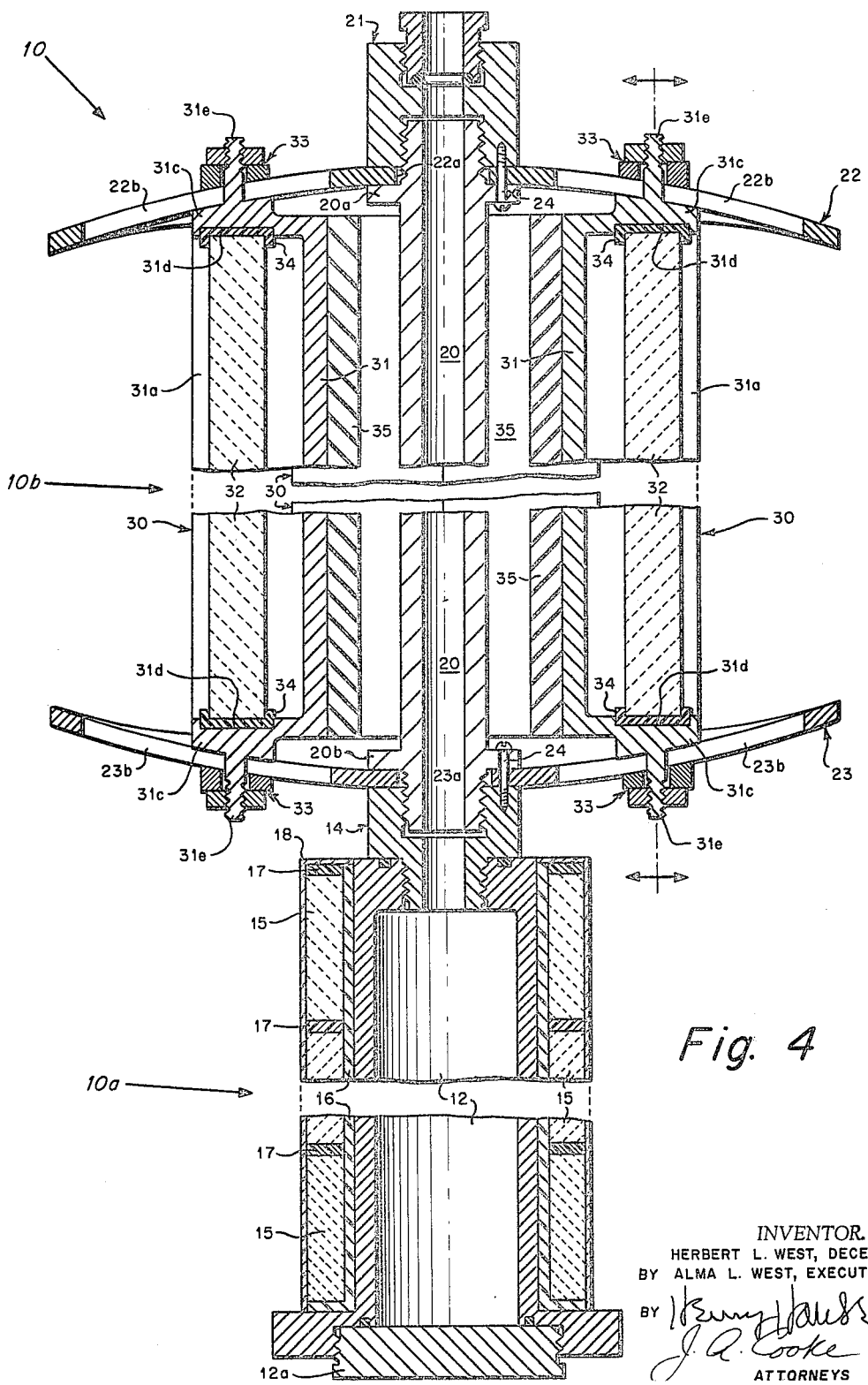
FIG. 4 shows a foreshortened sectional view taken on the line 4—4 of FIG. 1.

Referring now to the drawings, wherein like reference characters designate like or corresponding parts throughout the several views, there is shown in FIG. 1 a dipped sonar transducer generally noted at 10 which is normally suspended from a helicopter by a supporting cable and quick-release coupling, not shown, and which includes a projector portion 10a for transmitting sonar signals and a hydrophone section 10b for receiving sonar signals. As illustrated in FIGS. 1 and 4 the projector portion 10a consists of a hollow metallic tube 12 threaded at one end thereof for receiving a plug 12a and threaded at the other end to receive a coupling member 14 for connecting the projector portion 10a to the hydrophone section 10b.

A plurality of hollow, cylindrical, prepolarized electromechanical transducer elements 15 of barium titanate, lead zirconate titanate or other piezoelectric ceramic materials are stacked along the length of tube 12, surround the same and are spaced therefrom by a decoupling sleeve 16 of a highly elastic, uniform density, low bulk modulus material, such as a synthetic rubber made by the polymerization of 2-chloro-1,3 butadiene, neoprene, polyurethane, or the like and void of any entrapped air.

A plurality of disk-shaped washers 17 are inserted between the stacked hollow cylinders 15, the disk-shaped washers being constructed of the same decoupling material as in sleeve 16. The resulting unit is encased with a water-tight, decoupling sheath 18 of still the same material. Elements 16 and 17 constitute the pressure-release material which in the present case is unaffected by the pressures incident to the great depths of water into which the projector may be immersed.

It should be understood that the hollow metallic tube 12 may be flooded or may serve as a housing for electronic equipment placed therein. Further, the transducer elements 15 are appropriately wired in a manner known in the art with the same passing upwardly through coupling 14, hydrophone section 10b and through the supporting cable to the supporting helicopter.

The hydrophone section 10b includes an elongated hollow cylindrical rod 20 threaded at one end for engaging coupling 14 and threaded at the other end for engaging a release coupling 21 which in turn is threaded to connect the dipped sonar transducer 10 to the supporting helicopter through the quick-release coupling, not shown. Annular flanges 20a and 20b are formed on the rod 20 for securing a pair of curved adjusting plates 22 and 23 to the rod 20 through fasteners 24 and for spacing the plates 22 and 23 with respect to each other.

Figure 2:
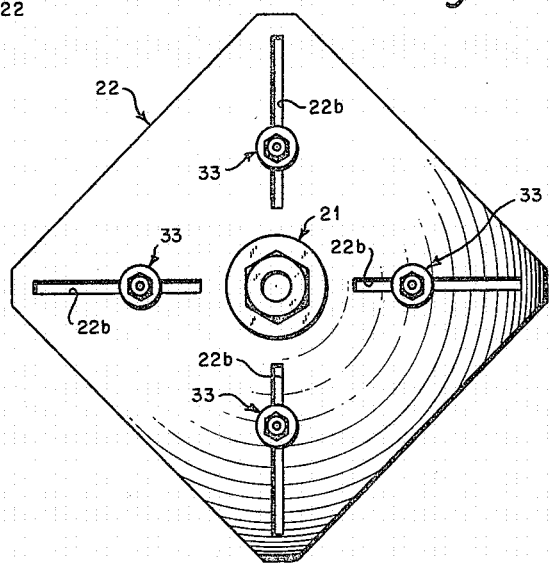
FIG. 2 illustrates a plan view of the apparatus shown in FIG. 1.

Referring to FIG. 2, upper curved plate 22, which is substantially identical to lower curved plate 23, is formed with an aperture 22a formed therein for permitting rod 20 to extend therethrough. Curved plate 22 is of substantially square configuration having slots 22b formed therein and extending diagonally of the plate. Curved plate 23 similarly has an aperture 23a for the rod 20 to pass through and diagonal slots 23b.

Figure 3:
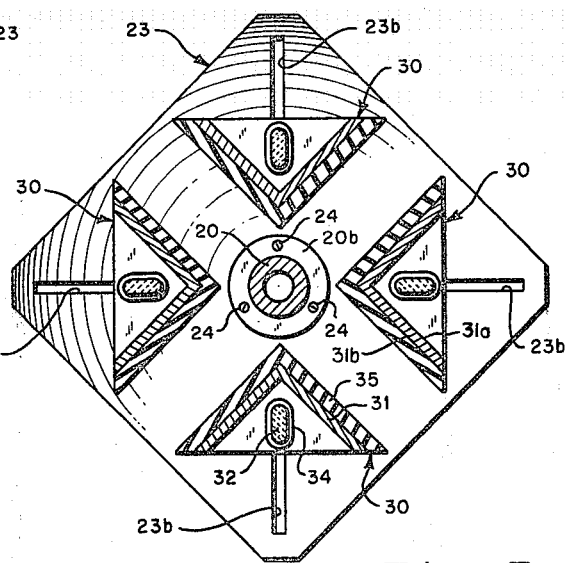
FIG. 3 shows a section of the device taken on the line 3—3 of FIG. 1.

As viewed in FIGS. 1, 3 and 4 a reflector assembly generally noted at 30 is adjustably supported by and between the spaced curved plates 22 and 23. As viewed more particularly in FIGS. 3 and 4, the reflector assembly 30 includes a plurality of longitudinally extending, V-shaped channel members 31, each having outwardly facing interior reflecting surfaces 31a and inwardly facing exterior surfaces 31b and being radially spaced from rod 20 with the apex thereof adjacent rod 20. The ends of each of the channel members 31 are additionally constructed with flanges 31c having pockets 31d formed therein for receiving and housing a stave 32 of transducer material of the type known and used in the art.

Each of the flanges 31c of the channel member includes an outwardly extending fastening element 31e which passes through the diagonal slots 22b–23b formed in plates 22–23, respectively. Fastening elements 33 cooperate with each respective fastener 31e and diagonal slot for permitting adjusting and fastening of the reflector assembly 30 with respect to plates 22 and 23. By reason of the curvature of the plates and the slot arrangement therein, the reflector assembly 30 may be adjusted to any angular position relative to the longitudinal axis of the hydrophone assembly 10b. Stave 32 is retained within the pocket 31d of the channel 31 by neoprene or polyurethane cement 34.

As illustrated clearly in FIG. 3, the inwardly facing exterior surface 31b is coated with a decoupling jacket 35 of a highly elastic, uniform density, low bulk modulus material similar to that described above with reference to the decoupling sleeve 16. The channel member 31 is formed of metallic material having a high mass, density and bulk modulus and is of such thickness that any additional weight, size or thickness of this material will result in relatively small increases in the desired effect of decreasing transmission of received sonar signals.

The staves 32 are appropriately spaced relative to the surfaces 31a in a manner known in the art and are appropriately wired in a manner also known in the art to provide directional and other information relative to received sonar signals to equipment in the supporting helicopter. This wiring may conveniently extend through the hollow recess formed in rod 20 and upwardly through the cable securing the dipped sonar transducer 10 to the helicopter.

It is seen from the above that the disadvantages of the prior art projectors are negated by the present invention by decoupling adjacent active elements, as well as decoupling active elements and other parts of the projector's structure, with materials which have a bulk modulus value which differ markedly from the value for the portions to be decoupled and include no entrapped air. In the present invention, each cylindrical ceramic element is supported individually by a center piece of metal tubing and the elements are insulated from this central tubing by the insertion of washers or other type spacers between the piezoelectric elements. These spacers are made of a material which is highly elastic, such as polyurethane or the like. Piezoelectric elements so decoupled will remain decoupled under extremely high hydrostatic pressures.

It is also seen that the disadvantages of the prior art reflectors are negated by the present invention by providing a corner reflector of high density material designed to be of the optimum thickness for overall requirements of the reflector which is determined as the region in which additional weight and size of the dense material results in relatively slight increases in the desired effect and applying to the reflecting material having great mass and high bulk modulus value a highly elastic material to the back thereof.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. An electric-acoustic transducer operable at pressures incident to great depths of a surrounding acoustic wave transmitting medium comprising:
   a support tube;
   a plurality of cylindrical transducing elements stacked along a portion of the length of said tube; and
   means interposed between said transducing elements and between said transducing elements and said tube for mechanically decoupling the same, said means constructed of an elastic, uniform density material which is free of entrapped gas and has a relatively low bulk modulus compared with that of said transducing elements.

2. The combination as defined in claim 1 wherein said mechanically decoupling means is a synthetic rubber made by polymerization of 2-chloro-1,3 butadiene.

3. The combination as defined in claim 1 wherein said means for mechanically decoupling is neoprene.

4. The combination as defined in claim 1 wherein said decoupling means is polyurethane.

5. An electro-acoustic transducer operable at the pressures incident to great depths of a surrounding acoustic wave transmitting medium comprising:
   a support tube;
   a pair of spaced support plates secured to said support tube;
   a plurality of substantially parallel extending, elongated transducing units circumferentially arranged about said support tube and secured to said plates to provide omnidirectional search;
   and a corresponding plurality of reflector means each operatively associated with its respective transducing unit and subtending a predetermined sector of search, said reflector being constructed of a material of high mass and density coated with a highly elastic, uniform density material.

6. The combination as defined in claim 5 wherein said reflector means is constructed of a material of high mass, density, and bulk modulus value coated with a highly elastic material of substantially differing bulk modulus value.

7. The combination as defined in claim 5 wherein each of said reflector means is of V-shaped configuration, and extends longitudinally of said support tube with the ends thereof adjustably secured to said spaced plates and with the apex thereof positioned adjacent said supporting tube.

8. The combination as defined in claim 5 wherein said reflector means is constructed of a metallic material coated with neoprene.

9. The combination as defined in claim 5 wherein said reflector means is constructed of a metallic material coated with polyurethane.

10. The combination as defined in claim 6 wherein the reflector means is constructed of a metallic material coated with a synthetic rubber made by the polymerization of 2-chloro-1,3 butadiene.

11. An electro-acoustic transducer operable at the pressures incident to great depths of a surrounding acoustic wave transmitting medium comprising:
    a support member;
    a plurality of cylindrical transducing elements stacked along a portion of the length of said member;
    means interposed between said transducing elements and between said transducing elements and said member for mechanically decoupling the same, said means constructed of an elastic, uniform density material;
    a pair of support plates secured to said support member and spaced from said cylindrical transducing elements;
    a plurality of substantially parallel extending elongated transducing units circumferentially arranged about said support member to provide omnidirectional search;
    and a corresponding plurality of reflector means each operatively associated with its respective transducing unit and subtending a predetermined sector of search, said reflector being constructed of a material of high mass and density coated with a highly elastic, uniform density material.

12. The combination as defined in claim 11 wherein said reflector means is constructed of a material of high mass, density, and bulk modulus value coated with a highly elastic material of substantially differing bulk modulus value.

13. The combination as defined in claim 11 wherein each of said reflector means is of V-shaped configuration, and extends longitudinally of said support member with the ends thereof adjustably secured to said spaced plates and with the apex thereof positioned adjacent said supporting member.

14. The combination as defined in claim 13 wherein said reflector means is constructed of a metallic material coated with neoprene.

15. The combination as defined in claim 13 wherein said reflector means is constructed of a metallic material coated with polyurethane.

16. The combination as defined in claim 13 wherein the reflector means is constructed of a metallic material coated with a synthetic rubber made by the polymerization of 2-chloro-1,3 butadiene.

17. An electro-acoustic transducer operable at pressures incident to great depths of a surrounding acoustic wave transmitting medium comprising:
    a support tube;
    a hollow, cylindrical transducing element disposed about and coaxially of said tube; and
    means interposed between said transducing element and said tube for mechanically decoupling the same, said means constructed of an elastic, uniform density material which is free of entrapped gas and has a relatively low bulk modulus compared with that of said transducing element.

References Cited by the Examiner

UNITED STATES PATENTS

| | | | |
|---|---|---|---|
| 2,761,077 | 8/1956 | Harris | 340—11 |
| 2,961,636 | 11/1960 | Benecke | 340—6 X |
| 3,007,133 | 10/1961 | Padberg et al. | 340—12 |
| 3,139,603 | 6/1964 | Church et al. | 340—10 |
| 3,142,035 | 7/1964 | Harris | 340—10 |
| 3,172,078 | 3/1965 | Mazzagatti | 340—10 |
| 3,178,681 | 5/1965 | Horseman et al. | 340—10 |

CHESTER L. JUSTUS, *Primary Examiner.*

G. M. FISHER, *Assistant Examiner.*